United States Patent
Akdemir et al.

(10) Patent No.: US 9,715,587 B2
(45) Date of Patent: *Jul. 25, 2017

(54) IMPLEMENTING SECURITY FUNCTIONS USING ROM

(71) Applicant: MARVELL WORLD TRADE LTD, St. Michael (BB)

(72) Inventors: Kahraman D. Akdemir, Franklin, MA (US); Tolga Nihat Aytek, Framingham, MA (US)

(73) Assignee: MARVELL WORLD TRADE LTD. (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,997

(22) Filed: Feb. 24, 2016

(65) Prior Publication Data
US 2016/0171210 A1   Jun. 16, 2016

Related U.S. Application Data

(63) Continuation of application No. 13/905,255, filed on May 30, 2013, now Pat. No. 9,275,196.

(Continued)

(51) Int. Cl.
*G06F 9/24* (2006.01)
*G06F 15/177* (2006.01)
(Continued)

(52) U.S. Cl.
CPC ............ *G06F 21/51* (2013.01); *G06F 9/4406* (2013.01); *G06F 21/00* (2013.01); *G06F 21/121* (2013.01); *G06F 21/57* (2013.01); *G06F 21/572* (2013.01); *G06F 21/575* (2013.01); *G06F 21/64* (2013.01); *G06F 3/0632* (2013.01); *G06F 8/66* (2013.01); *G06F 9/4401* (2013.01); *G06F 9/4403* (2013.01); *G06F 11/1417* (2013.01); *G06F 13/404* (2013.01)

(58) Field of Classification Search
CPC .. G06F 11/1417; G06F 3/0632; G06F 9/4403; G06F 21/572; G06F 9/4401; G06F 21/575; G06F 21/121; G06F 13/404
USPC ................................................. 713/1, 2, 100
See application file for complete search history.

(56) References Cited

U.S. PATENT DOCUMENTS

6,106,396 A   8/2000 Alcorn et al.
6,185,678 B1   2/2001 Arbaugh et al.
(Continued)

OTHER PUBLICATIONS

Patent Cooperation Treaty (PCT), International Search Report and Written Opinion issued in International Application No. PCT/IB2013/001321 (International Filing Date: May 30, 2013) having a Date of Mailing of Sep. 16, 2013 (8 pgs).

*Primary Examiner* — Michael J Brown

(57) ABSTRACT

Systems, methods, and other embodiments associated with implementing security functions are described. According to one embodiment, a device includes a memory storing (i) a plurality of functions and (ii) a mapping of locations of the plurality of functions in the memory. The device includes a processing unit configured to, in response to a request by a process being executed by the processing unit, determine a location in the memory of a security function of the plurality of functions using the mapping. The processing unit is configured to execute the security function for the process from the memory according to the mapping.

20 Claims, 4 Drawing Sheets

Related U.S. Application Data

(60) Provisional application No. 61/653,548, filed on May 31, 2012.

(51) Int. Cl.
*G06F 21/51* (2013.01)
*G06F 21/57* (2013.01)
*G06F 21/12* (2013.01)
*G06F 21/00* (2013.01)
*G06F 21/64* (2013.01)
G06F 9/44 (2006.01)
G06F 11/14 (2006.01)
G06F 3/06 (2006.01)
G06F 13/40 (2006.01)
G06F 9/445 (2006.01)

(56) References Cited

U.S. PATENT DOCUMENTS 6,775,778 B1   8/2004   Laczko et al.
9,275,196 B2 *  3/2016   Akdemir ................ G06F 21/00

* cited by examiner

IMPLEMENTING SECURITY FUNCTIONS USING ROM

CROSS REFERENCE TO RELATED APPLICATIONS

This patent disclosure is a continuation of U.S. patent application Ser. No. 13/905,255 filed May 30, 2013, now U.S. Pat. No. 9,275,196, which claims the benefit of U.S. provisional application Ser. No. 61/653,548 filed on May 31, 2012, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

To protect against malicious attacks, an electronic device may use security functions to establish a trusted operating environment. The security functions are a set of routines in a software stack that permit programs that operate on the electronic device to authentic and verify themselves and other programs in order to create the trusted operating environment. Consequently, each program that operates on the electronic device also individually implements the security functions. However, because each program implements the security functions individually, extra storage space is consumed and the security functions are vulnerable to malicious alteration.

SUMMARY

In general, in one aspect, this specification discloses an apparatus. The apparatus includes a memory storing (i) a plurality of functions and (ii) a mapping of locations of the plurality of functions in the memory. The apparatus includes a processor configured to generate a callback to a security function of the plurality of functions. The callback is a function call for the security function to execute. The processor is configured to, in response to the callback, determine a location in the memory of the security function using the mapping. The processor is configured to execute the security function upon branching to the location of the security function in the memory according to the mapping.

In general, in another aspect, this specification discloses a method. The method includes generating, by a processor, a callback to a security function stored in a memory associated with the processor. The memory includes a plurality of functions. The callback is a function call for the security function to execute. The method includes, in response to the callback, determining a location in the memory of the security function using a mapping of the plurality of functions in the memory. The method includes executing, by the processor, the security function using the location of the security function in the memory according to the mapping to access the security function.

In general, in another aspect, this specification discloses a device. The device includes a memory storing (i) a plurality of functions and (ii) a mapping of locations of the plurality of functions in the memory. The device includes a processing unit configured to, in response to a request by a process being executed by the processing unit, determine a location in the memory of a security function of the plurality of functions using the mapping. The processing unit is configured to execute the security function for the process from the memory according to the mapping.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with implementing security functions for a device using a read-only memory (ROM). Consider that maintaining security on an electronic device can be a difficult task. For example, an electronic device operates using a plurality of programs that are each subject to malicious alteration or attack. A successful attack on any individual program can result in the electronic device being compromised and sensitive information being lost or the electronic device being damaged. Accordingly, securing the plurality of programs against malicious attacks is advantageous to ensure secure operation of the electronic device.

Further consider that typically each of the plurality of programs separately implement the security functions for individual use when establishing a secure environment in the electronic device between the plurality of programs. Additionally, because each program separately implements the security functions, the security functions are individually included within code of each of the plurality of programs that is stored in a programmable memory (e.g., RAM or non-volatile memory), which is by its nature modifiable. Thus, the security functions are vulnerable to alteration since they are stored in a modifiable memory, which can be altered by a malicious attack. Additionally, individually implementing the security functions in this way results in redundant code for the security functions within each program that thereby consumes more storage space.

Therefore, in one embodiment, the electronic device is configured with a read-only memory (ROM) that stores the security functions, which are then used by the plurality of programs. The ROM is a storage medium that is, in general, un-alterable. Once the security functions are written to the ROM, the security functions in the ROM cannot be altered since the ROM is written only once during the manufacturing of the ROM. Accordingly, storing the security functions in the ROM secures the security functions against malicious alteration and also aggregates the security functions into a central location thereby saving storage space in memory reserved for the programs.

Figure 1:
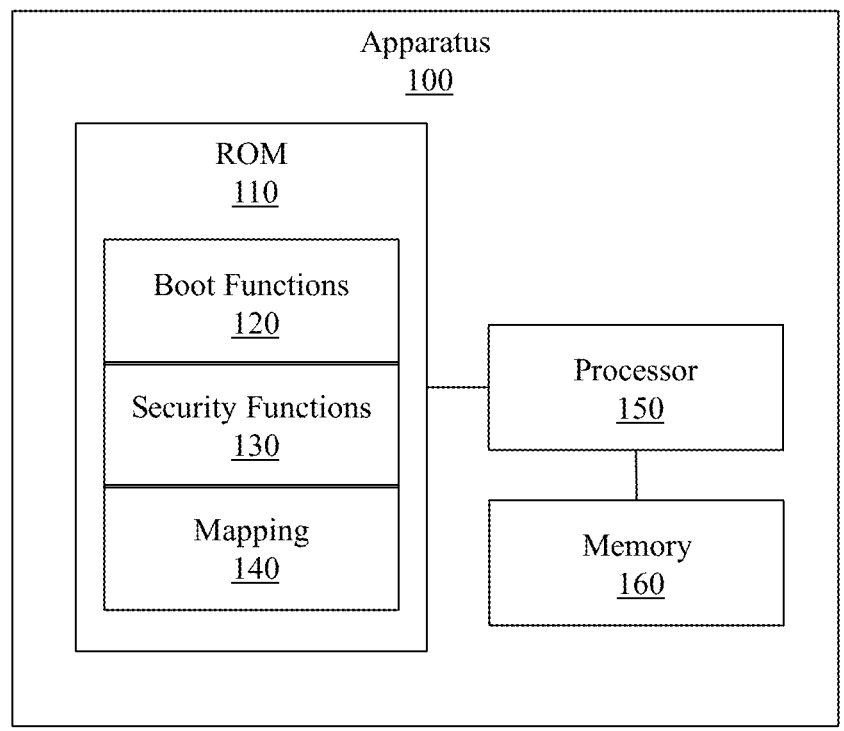
FIG. 1 illustrates one embodiment of an apparatus associated with implementing security functions for a device using a read-only memory (ROM).

With reference to FIG. 1, one embodiment of an apparatus 100 is illustrated that is associated with implementing security functions using a read-only memory (ROM). For example, the apparatus 100 includes a read-only memory (ROM) 110 that is configured with boot functions 120, security functions 130 and, a mapping 140. The apparatus 100 also includes a processor 150 and a memory 160. In one embodiment, the apparatus 100 is a mobile device (e.g., a cellular telephone or smart phone), a tablet computer, a laptop, a system on a chip (SOC), a processor, or, in general, an electronic device that uses security functions to establish a trusted computing environment for a plurality of programs.

The apparatus 100 executes the plurality of different programs using the processor 150. The plurality of programs include, for example, a system kernel, a boot loader, an operating system (OS), productivity applications or, in general, any application that operates on the apparatus 100. The memory 160 stores the plurality of programs for execution by the processor 150. In one embodiment, the memory 160 is a random access memory (RAM), flash memory, non-volatile memory, or a combination of volatile and non-volatile memories. In either case, the memory 160 is a programmable memory used by the processor 150 to store data and the plurality of programs. Therefore, data stored in the memory 160 that includes the plurality of programs is subject to alteration. Accordingly, data in the memory 160 can be maliciously altered if not secured using the security functions 130.

By contrast, the ROM 110 is not alterable. That is, the ROM 110 is, for example, programmed with the boot functions 120, the security functions 130 and the mapping 140 as part of an original manufacturing process and once programmed the ROM 110 cannot be changed. Accordingly, data stored in the ROM 110 is static and secure against alteration. Thus, in one embodiment, the security functions 130 are stored in the ROM 110. In this way, the security functions 130 are secure against malicious alteration or attack and thus are used by the apparatus 100 to establish a root of trust. That is, since the security functions 130 are known to be secure since they are stored in unalterable memory (i.e., the ROM 110), the security functions 130 are used to secure the plurality of programs in the memory 160 to extend security of the security functions 130 to the plurality of programs and data in the memory 160.

In one embodiment, the security functions 130 include Secure Hash Algorithm (SHA) functions such as SHA-1, SHA-2 (i.e., SHA-256, SHA-512, etc.), SHA-3, and so on. The security functions 130 also include, for example, public-key cryptography standard (PKCS) functions for performing cryptographic functions (e.g., digital signature verification), elliptic curve digital signature algorithm (ECDSA) functions, pseudo-random number/nonce generator functions, symmetric cryptography functions, asymmetric cryptography functions, and so on. In general, the security functions 130 in the ROM 110 include security functions used by the apparatus 100 to establish secure communications between programs/devices and to verify authenticity of data. In this way, the apparatus 100 uses the security functions 130 to create a trusted computing environment.

Furthermore, in one embodiment, the ROM 110 is a ROM basic input/output system (BIOS) that includes the boot functions 120 integrated along with the security functions 130 and the mapping 140. The boot functions 120 include, for example, functions for initiating the apparatus 100. That is, the boot functions 120 are initialization functions that load drivers, programs (e.g., operating system) and other data into, for example, the memory 160 so that the processor 150 can operate and control various attributes/components of the apparatus 100. In one embodiment, the boot functions 120 use the security functions 130 to verify that the boot functions 120 and the apparatus 100 are valid and secure. By integrating the security functions 130 with the boot functions 120 in the ROM 110, the security functions 130 are secured by ensuring that they cannot be altered. Accordingly, trust established by securing the security functions 130 in the ROM 110 extends to the plurality of programs that use the security functions 130 to verify and authenticate themselves and other programs. Additionally, storing the security functions 130 and the boot functions 120 together in a single ROM 110 consolidates components of the apparatus 100 and, for example, simplifies manufacturing of the ROM 110 and the apparatus 100.

After the apparatus 100 has booted using, for example, the boot functions 120 and the security functions 130, processes (i.e., the plurality of programs) operating on the processor 150 and loaded from the memory 160 access and use the security functions 130. In one embodiment, a program from the plurality of programs uses one or more of the security functions 130 by requesting a callback to one of the security functions 130. That is, program code in a binary code stack for the program includes a request (i.e., function call or callback) to the security function. Accordingly, in one embodiment, the processor 150 is configured to generate a callback to the security function in response to the request by the program for the security function. Thus, the processor 150 is configured to generate the callback for the security function upon receiving a request for the security function from the program.

Additionally, because there may be a plurality of the security functions 130 in the ROM 110 and configurations of the boot functions 120 and the security functions 130 may differ depending on a specific implementation, the programs may not be able to directly address the security functions 130. That is, the security functions 130 can be stored in many different configurations in the ROM 110 and which the security functions 130 are stored is not, in general, known to processes/programs executed by the processor 150. Thus, the processor 150 is configured to, in response to the callback, determine a location in the ROM 110 of the requested security function among the security functions 130 using the mapping 140. The mapping is a table, index, list, chart or other data structure that species a location/address of each of the security functions 130 in the ROM 110 among the boot functions 120 and any other data stored in the ROM 110. In this way, the processor 150 dynamically locates the requested security function on-the-fly within the ROM 110 when requested instead of requiring the process to statically code a location of the security function into code of the process.

Figure 2:
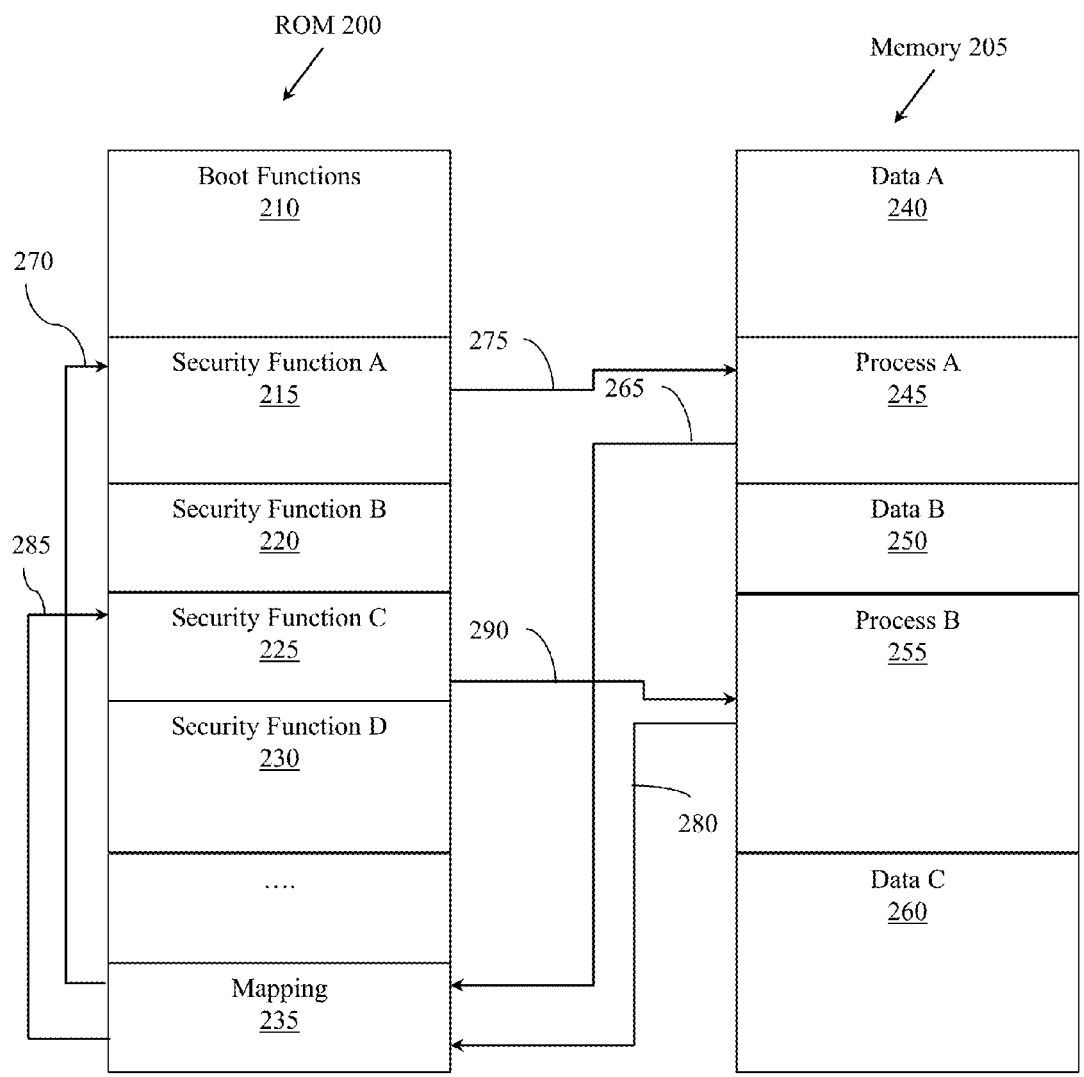
FIG. 2 illustrates one embodiment of a ROM associated with implementing security functions.

For example, FIG. 2 illustrates one example of the ROM 110 and the memory 160 from FIG. 1. In FIG. 2, a ROM 200 associated with implementing security functions for a device (e.g., the apparatus 100) is shown. FIG. 2 will be discussed along with FIG. 1 and with the ROM 200 in place of the ROM 110 and a memory 205 in place of the memory 160. The memory 205 stores data and programs (i.e., processes) that are executed by the processor 150. Furthermore, similar to the ROM 110 of FIG. 1, the ROM 200 includes boot functions 210 for initiating the apparatus 100. The ROM 200 also stores security functions (e.g., security functions 130) that include a security function A 215, a security function B 220, a security function C 225, and a security function D 230. The security functions 215-230 are similar to the security functions 130 of FIG. 1. While four security functions are discussed, of course, a different number of security functions (e.g., 2, 5, 10, etc.) can be implemented with the ROM 200. The ROM 200 also includes a mapping 235 that specifies locations/addresses of the security functions 215-230 in the ROM 200.

Consider that when the processor 150 generates a callback for one of the security functions 215-230, the processor 150 uses the mapping 235 to determine where in the ROM 200 a requested security function is located. That is, the processor 150 references the mapping 235 to determine an address of the requested security function in the ROM 200. In this way, the processor 150 branches/jumps to the address of the security function in the ROM 200 and then execute the security function without statically programming the process with the address. In one embodiment, the processor 150 adjusts a program counter or other instruction counter to branch to the address of the security function. The processor 150 is configured to adjust the program counter by, for example, using an offset or address specified in the mapping 235. In this way, the processor 150 jumps from a point in a process that requested the security function to the security function in the ROM 200.

As an example, consider the memory 205, which stores data and different processes (i.e., programs). The memory 205 includes, for example, data A 240, process A 245, data B 250, process B 255, and data C 260. Further consider that the processor 150 is currently executing the process A 245. While executing the process A 245, the processor 150 reaches a point 265 in binary program code of the process A 245 that requests the security function A 215 from the ROM 200. Accordingly, the processor 150 is configured to generate a callback to the security function in the ROM 200 upon reaching the point 265 in the code of the process.

Furthermore, the processor 150 is configured to, in response to the callback, determine a location (i.e., address) of the security function A 215 in the ROM 200. Consequently, the processor 150 references the mapping 235 using, for example, an ID of the requested security function A 215. In the example of FIG. 2, the processor 150 determines the location of the security function A 215 and branches/jumps to the location of the security function A 215 at 270. Consequently, the processor 150 proceeds to execute the security function A 215. After completing execution of the security function A 215, the processor 150 jumps back to the process A 245 at 275.

Similarly, when executing the process B 255, the processor 150 encounters a request for the security function C 225 at a point 280 in code of the process B 255. Thus, the processor 150 generates a callback to the security function C 225 and proceeds to check the mapping 235 for a location of the security function C 225 in the ROM 200. The processor 150 then jumps, at 285, to the location as determined from the mapping 235 and proceeds to execute the security function C 225. After executing the security function C 225, the processor 150 returns to where the initial request for the security function C 225 occurred in the process B 255 and proceeds with executing the process B 255.

Additionally, the processor 150 at 275 and at 290 when returning to a respective process that called the security functions returns, for example, results from the security functions to the respective process. In this way, processes (e.g., 245, 255, etc.) executed by the processor 150 call the security functions stored in the ROM 200 and do not include the functions in code of the processes themselves in the memory 205, but instead include only a request for the security functions in the ROM 200. Furthermore, when requesting the security functions, the processes (e.g., 245, 255, etc.) pass variables (e.g., data, digital signatures, cryptographic keys, and so on) to the security functions for use by the security functions. In this way, each process/program provides process specific information to the security functions so that the security functions can perform specific iterations of the security functions customized for individual processes.

Additionally, while the memory 205 is illustrated with two processes (i.e., 245 and 255), the memory 205 can, of course, include a different number of processes (e.g., 1, 10, etc.). Furthermore, the data 240, 250, and 260 may include other programs/processes and/or data used by the security functions 215-230 and/or the processes 245 and 255. In still other embodiments, the memory 205 is two separate memories. For example, the memory 205 may be a volatile (e.g., RAM) and a non-volatile (e.g., Flash or hard disk) memory. The non-volatile memory may store the programs when not being executed and the volatile memory may store the programs during execution by the processor 150.

Furthermore, the memory 205 includes processes that are not security functions and the ROM 200 includes the security functions. Accordingly, the processor 150 is configured to, for example, access the memory 205 when executing processes that are not security functions and to access the ROM 200 to execute the security functions 215-230. By storing the security functions 215-230 in the ROM 200 and executing the security functions from the ROM 200, the apparatus 100 maintains the security functions 215-230 as tamper proof. The ROM 200 is an unmodifiable memory and cannot be modified after it is fabricated. Thus the security functions in the ROM 200 or other contents also cannot be modified. Accordingly, the security functions 215-230 in the ROM 200 are tamper proof or immune from malicious alteration.

Therefore, the security functions 215-230 in the ROM 200 are trusted because they are inherently secure from alteration by way of being stored in an un-modifiable memory (i.e., the ROM 200). Consequently, the apparatus 100 uses the security functions to establish a secure link between processes executed by the processor 150 and the security functions 215-230 using callbacks to the security functions in the ROM 200. The apparatus 100 establishes a trusted computing environment by using the security functions 215-230 to authenticate, verify, and more generally provide trusted security functions to processes/programs executed by the processor 150 that permit the processes/programs to be secure from malicious attack. However, because the security functions 215-230 are stored in the ROM 200 by embedding the security functions during the fabrication/manufacturing of the apparatus 100 with the ROM 200, the security functions cannot be later updated or modified, in general.

Furthermore, in one embodiment, the security functions (e.g., 215-230) are stored along with the boot functions 210 in the ROM 200, but are isolated from the boot functions 210. In this way, the apparatus 100 includes a single ROM to store both the boot functions 210 and the security functions 215-230. Additionally, when initializing the apparatus after a reset or power-on the boot functions 210 use the security functions by requesting the security functions 215-230 using the callback mechanism. Accordingly, in one embodiment, the boot functions 210 also access and use the security functions in the ROM 200.

Figure 3:
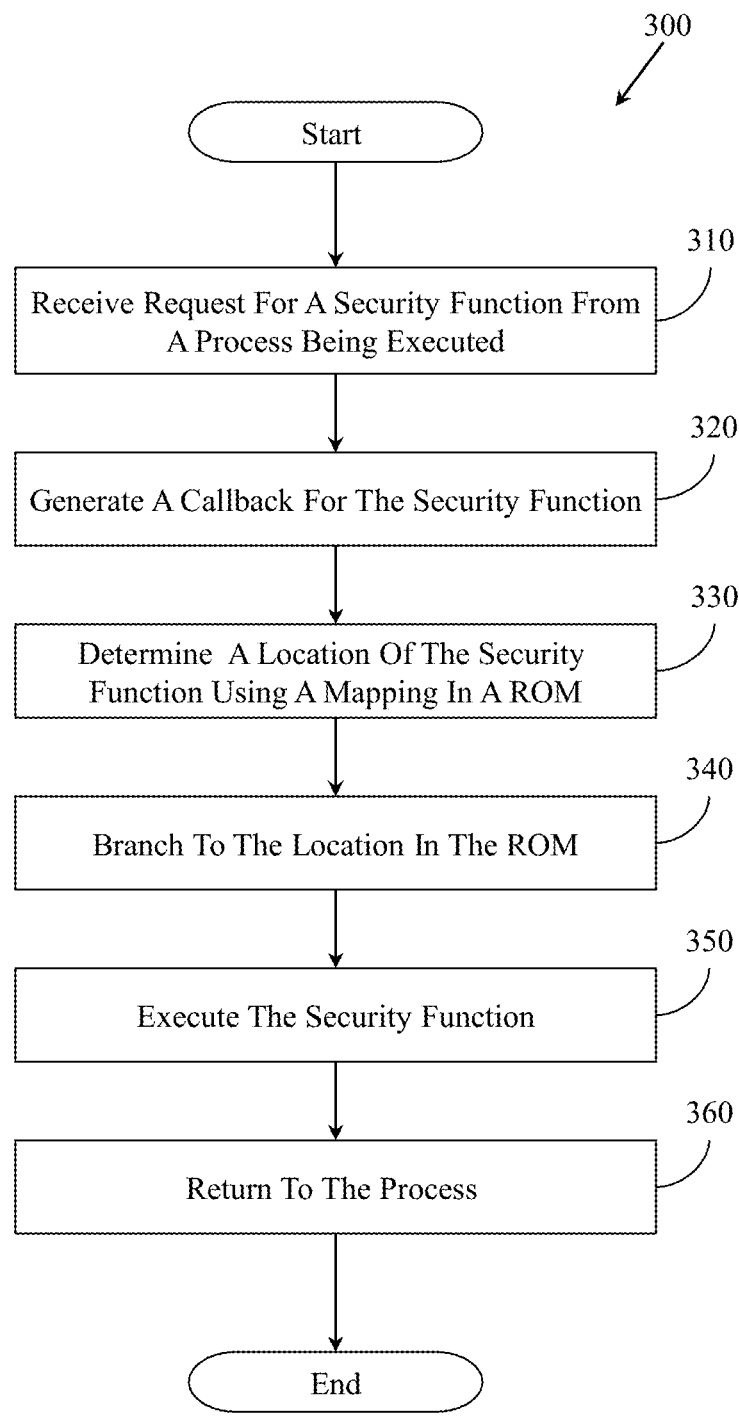
FIG. 3 illustrates one embodiment of a method associated with implementing security functions for a device using a read-only memory (ROM).

Further details of implementing security functions in a read-only memory (ROM) will be discussed with reference to FIG. 3. FIG. 3 illustrates a method 300 associated with using security functions stored in a ROM. FIG. 3 and method 300 will be discussed from the perspective of the apparatus 100 of FIG. 1.

At 310, a process being executed by the processor 150 in the apparatus 100 requests a security function. In general, the process is, for example, a program that is being executed by the processor 150 after the apparatus 100 has booted. However, in another embodiment, the process is a boot function (e.g., one of the boot functions 120) that is initiating the apparatus 100. In either case, the process is executed by the processor 150 and the security function is one of the security functions 130 that is stored in the ROM 110.

In general, the security functions 130 are stored in the ROM 110 as part of a manufacturing process to ensure that the security functions 130 are, for example, tamper proof since storing the security functions 130 in the ROM 110 renders the security functions 130 permanent and un-modifiable. Additionally, the ROM 110 is, for example, a ROM basic input/output system (BIOS) that includes trusted boot functions 120 that use the security functions 130 to establish a trusted boot. Accordingly, the security functions 130 in the ROM 110 can be used by many different functions executing on the apparatus 100 while maintaining a secure state since they cannot be maliciously altered.

Continuing with the method 300, at 320, the processor 150 generates a callback to one of the security functions 130 stored in the ROM 110 in response to the request from 310. That is, for example, the processor 150 reaches a request or call for a security function when executing a binary stack of code of the process. Consequently, the request causes the processor 150 to generate the callback at 320.

Additionally, at 330, in response to the callback from 320, the processor 150 determines a location (e.g., address or offset from a beginning of the ROM 110) in the ROM 110 of the requested security function using the mapping 140. In one embodiment, the mapping 140 is a lookup table or an index/map that indicates a location of each of the security functions 130 in the ROM 110. Accordingly, the processor 150 uses the mapping 140 to locate the security function requested by the process.

At 340, the processor 150 branches to the location in the ROM 110 of the security function as determined at 330 using the mapping 140. In one embodiment, the processor 150 branching to the requested security function includes adjusting a program counter, a pointer, or other indicator of a current instruction for execution to jump/branch to the location in the ROM 110 in order to begin executing the security function at 350. In general, the processor 150 jumps from a current location in the requesting process to the requested security function by causing the security function to be executed at 350 and thereby interrupting the process.

At 350, the processor 150 executes the requested security function. The processor 150 executes the security function by accessing the ROM 110 and executing instructions of the requested security function. In one embodiment, the processor 150 uses variables and/or other data provided by the requesting process when executing the security function from the ROM 110. In this way, the security function is customized to specifics of the requesting process.

At 360, the processor 150 returns to executing the requesting process after completing execution of the security function. In one embodiment, the processor 150 provides variables and/or other data (e.g., digital signature, encrypted/decrypted data, etc.) generated as a result of executing the security function back to the process. In this way, different programs/processes executing on the apparatus 100 use the security functions 130 as a central depository of security functions without individually implementing the security functions within each program/process. Additionally, storing the security functions 130 in the ROM 110 instead individually storing the security functions within each program reduces use of, for example, space in the memory 160.

Thus, by removing security functions from vulnerable programmable memory (e.g., memory 160) and storing the security functions in a ROM that is secure from modification, the apparatus 100 improves security and reduces storage demand in the memory 160 since each program no longer individually implements the security functions, but instead references the security functions in the ROM.

Figure 4:
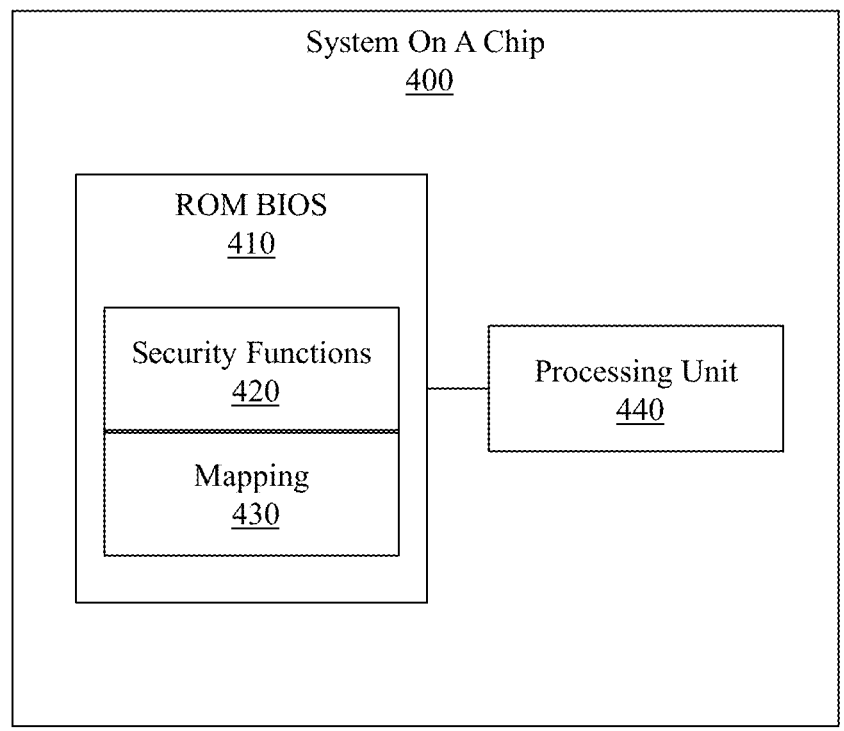
FIG. 4 illustrates on embodiment of a system on a chip (SOC) associated with implementing security functions using a read-only memory (ROM).

Continuing to FIG. 4, a system on a chip (SOC) 400 associated with using a ROM BIOS to implement security functions is illustrated. The SOC 400 includes a ROM BIOS 410 that stores security functions 420 and a mapping 430. The SOC 400 also includes a processing unit 440. The processing unit 440 is, for example, a central processing unit (CPU), logic, ASIC, or other device that executes computer instructions. The processing unit 440 is configured to, for example, execute the security functions 420 stored in the ROM BIOS 410.

That is, when a process being executed by the processing unit 440 encounters a request for a security function of the security functions 420, the processing unit 440 is configured to look-up an address of the security function using the mapping 430. The processing unit 440 is configured to use the address from the mapping 430 to load the security function and then execute the security function for the process.

The security functions 420 are stored in the ROM BIOS 410 and executed from the ROM BIOS 410 using the request and callback to the processing unit 440 so that the security functions 420 are secure from tampering. Consider that the ROM BIOS 410 is a ROM that is programmed with, for example, boot functions, the security functions 420 and the mapping 430 during manufacture of the SOC 400. Once the ROM BIOS 410 is programmed it becomes static and cannot be reprogrammed or altered. Accordingly, the static attributes of the ROM BIOS 410 provide an intrinsic security for the security functions 420 since by virtue of being stored in the ROM BIOS 410 they are secure from malicious alteration. Thus, storing the security functions 420 in the ROM 410 provides a secure root or base for establishing additional security in the SOC 400 using the security functions 420. That is, processes/programs executing on the SOC 400 use the security functions 420 with knowledge that they are secure. Thus, security/trust of the security functions 420 is extrapolated to the processes/programs that use the security functions 420 thereby establishing a trusted computing environment.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a memory storing (i) a plurality of functions and (ii) a mapping of locations of the plurality of functions in the memory;
a processor configured to:
generate a callback to a security function of the plurality of functions in response to a request from a process being executed by the processor, wherein the process (i) is a kernel, (ii) is a boot loader, or (iii) is requesting the security function, wherein the callback is a function call for the security function to execute,
in response to the callback, determine a location in the memory of the security function using the mapping,
use the mapping to select the security functions of the plurality of functions to execute when operating after booting, and
execute the security function upon branching to the location of the security function in the memory according to the mapping.

2. The apparatus of claim 1, wherein the memory is a memory of a basic input/output system (BIOS) that includes trusted boot functions that use the plurality of functions to establish a trusted boot, and
wherein the plurality of functions include (i) boot functions for initiating the apparatus and (ii) security functions for maintaining security within the apparatus.

3. The apparatus of claim 1, wherein the processor uses security functions included with the plurality of functions to establish a trusted computing environment that extends security in the apparatus to after execution of boot functions.

4. The apparatus of claim 1, further comprising:
a random access memory (RAM) that stores process functions associated with a second process executed by the processor, wherein the processor is configured (i) to access the RAM when executing the second process to execute the process functions that are not security functions and (ii) to access the memory to execute the plurality of functions.

5. The apparatus of claim 1, wherein the processor executes processes from the kernel after the boot loader is complete.

6. The apparatus of claim 1, wherein the processor is configured to, while executing the security function using the callback, establish a secure link to processes executed by the processor, wherein the plurality of functions are unmodifiable, and wherein the memory is a read-only memory (ROM).

7. The apparatus of claim 6, wherein the plurality of functions are stored in the ROM to maintain the plurality of functions as tamper proof, and wherein the plurality of functions include a digital signature function, and a pseudo-random number generator.

8. The apparatus of claim 1, wherein security functions in the plurality of functions are integrated within the memory and isolated from boot functions of the plurality of functions to secure the security functions from tampering.

9. The apparatus of claim 1, wherein the apparatus is manufactured by embedding the plurality of functions in the memory to securely store the plurality of functions.

10. A method, comprising:
generating, by a processor, a callback to a security function stored in a memory associated with the processor, wherein the memory includes a plurality of functions, and wherein the callback is a function call for the security function to execute;
in response to the callback, determining a location in the memory of the security function using a mapping of the plurality of functions in the memory;
selecting the security function from the memory when operating after the processor has booted; and
executing, by the processor, the security function using the location of the security function in the memory according to the mapping.

11. The method of claim 10, wherein the memory is a read-only memory (ROM) that is a ROM basic input/output system (BIOS) that includes trusted boot functions that use security functions of the plurality of functions to establish a trusted boot, and wherein selecting the security function includes selecting the security function from the ROM using the mapping when operating after the processor has booted.

12. The method of claim 10, wherein generating the callback occurs in response to a process requesting the security function, and wherein the process is a process being executed by the processor after the processor has booted.

13. The method of claim 10, further comprising:
accessing, by the processor, a random access memory (RAM) to execute functions that are not security functions for a process; and
accessing, by the processor, the memory to execute security functions of the plurality of functions, wherein the plurality of functions are stored in the memory to maintain the plurality of functions as tamper proof.

14. The method of claim 10, wherein generating the callback by the processor occurs in response to a request from a process being executed by the processor, and wherein the process is a kernel or a boot loader associated with the processor.

15. The method of claim 10, wherein executing the security function from the memory using the callback establishes a secure link to processes executed by the processor and wherein the security function in the memory is tamper proof.

16. The method of claim 10, wherein the plurality of functions include (i) boot functions and (ii) security functions that are stored in the memory to maintain the plurality of functions as tamper proof, and wherein the plurality of functions include a digital signature function, and a pseudo-random number generator function.

17. The method of claim 10, wherein security functions of the plurality of functions are integrated within the memory and isolated from boot functions to secure the security functions from tampering.

18. A device, comprising:
a memory storing (i) a plurality of functions and (ii) a mapping of locations of the plurality of functions in the memory;
a processing unit configured to:
in response to a request by a process being executed by the processing unit, determine a location in the memory of a security function of the plurality of functions using the mapping,
select the security function to execute when operating after booting, and
execute the security function for the process from the memory according to the mapping.

19. The device of claim 18, wherein the memory is a read-only memory (ROM) that is a ROM basic input/output system (BIOS), and wherein the plurality of functions include (i) boot functions for initiating the device and (ii) security functions for securing the device against tampering.

20. The device of claim 18, wherein the device is a processor that is integrated within a system on a chip (SOC).

* * * * *